INVENTOR
James C. Danly
Wolfe, Hubbard, Will & Cannon
ATTORNEY

INVENTOR
James C. Danly
Wolfe, Hubbard,
Voit & Osann
ATTORNEYS

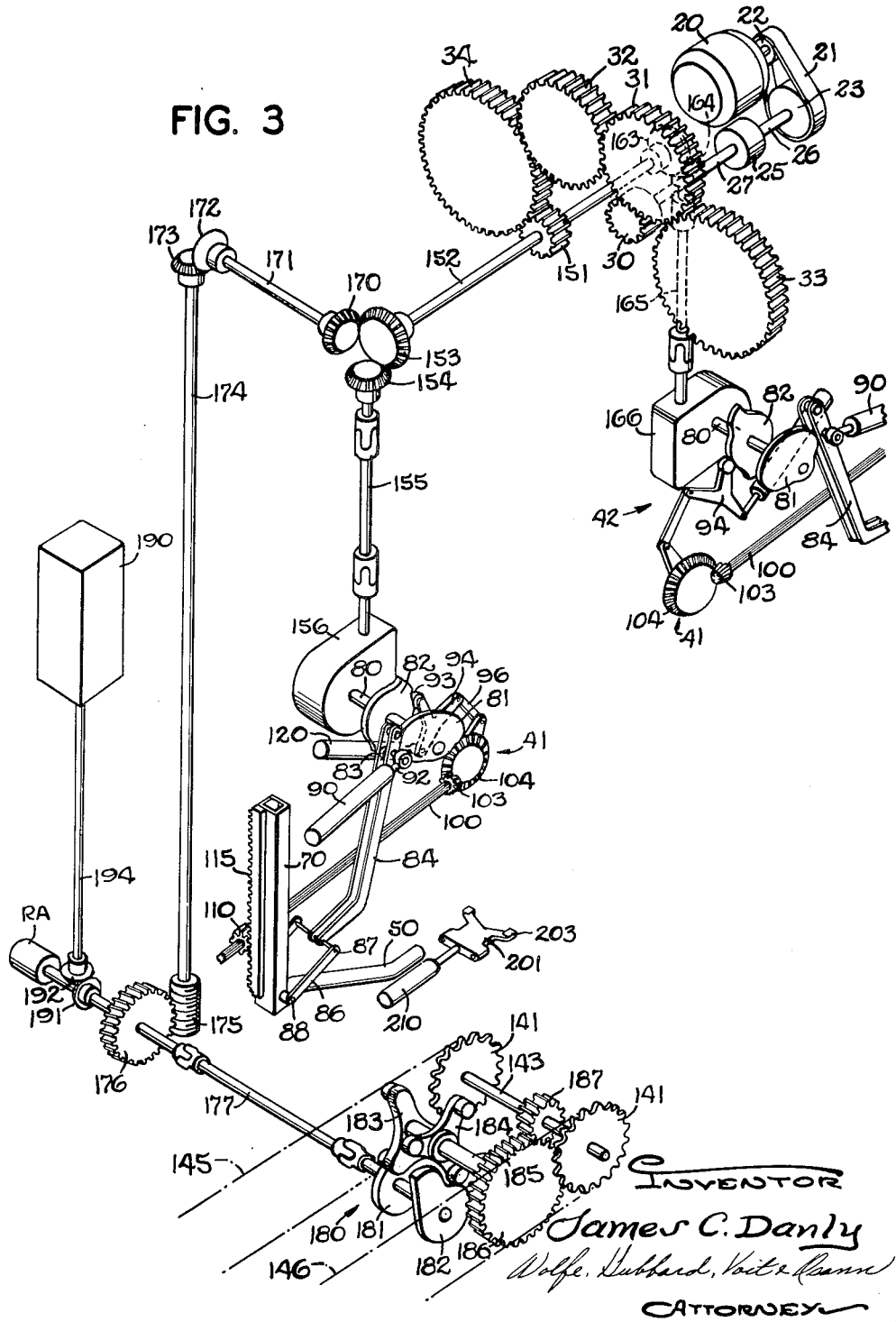

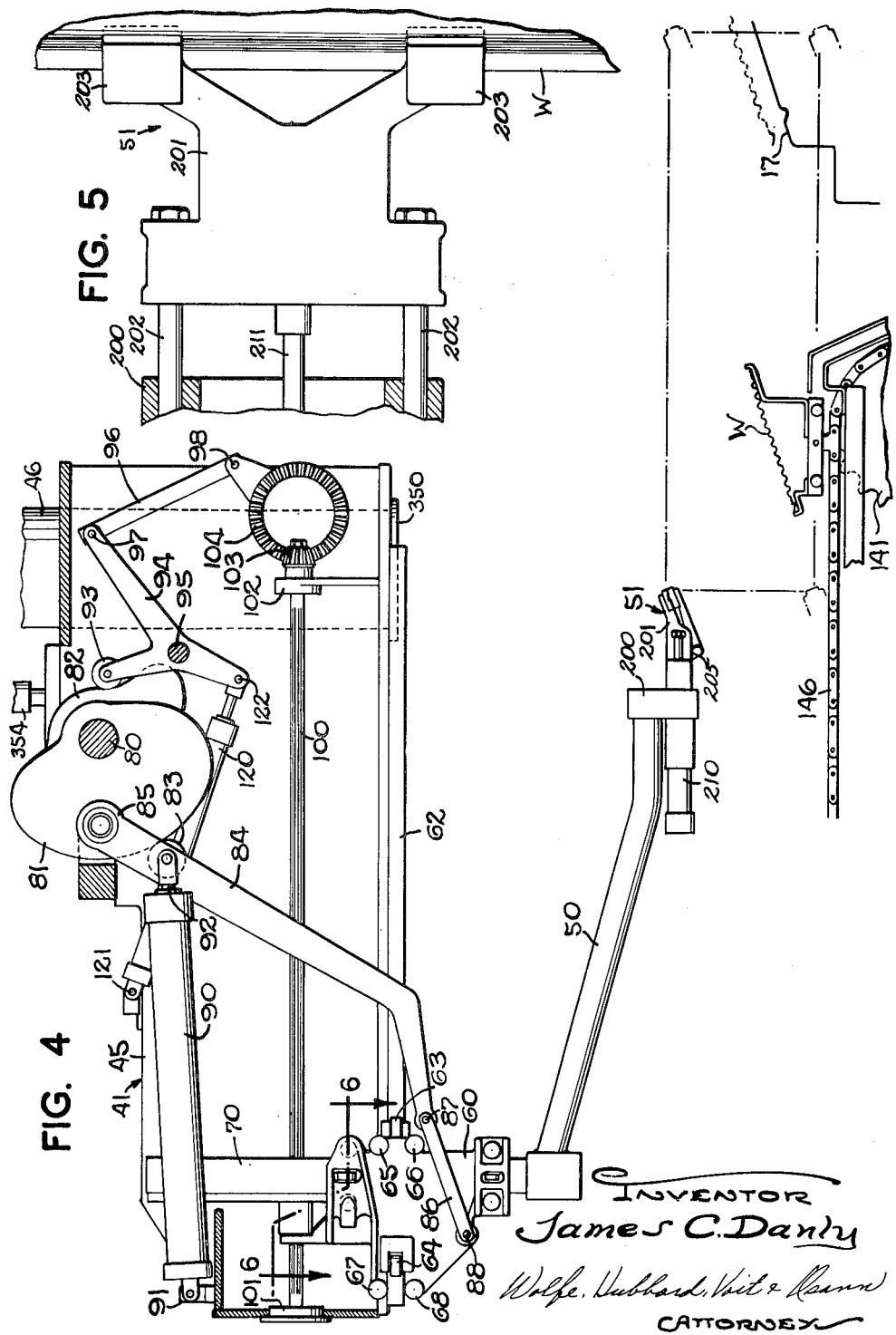

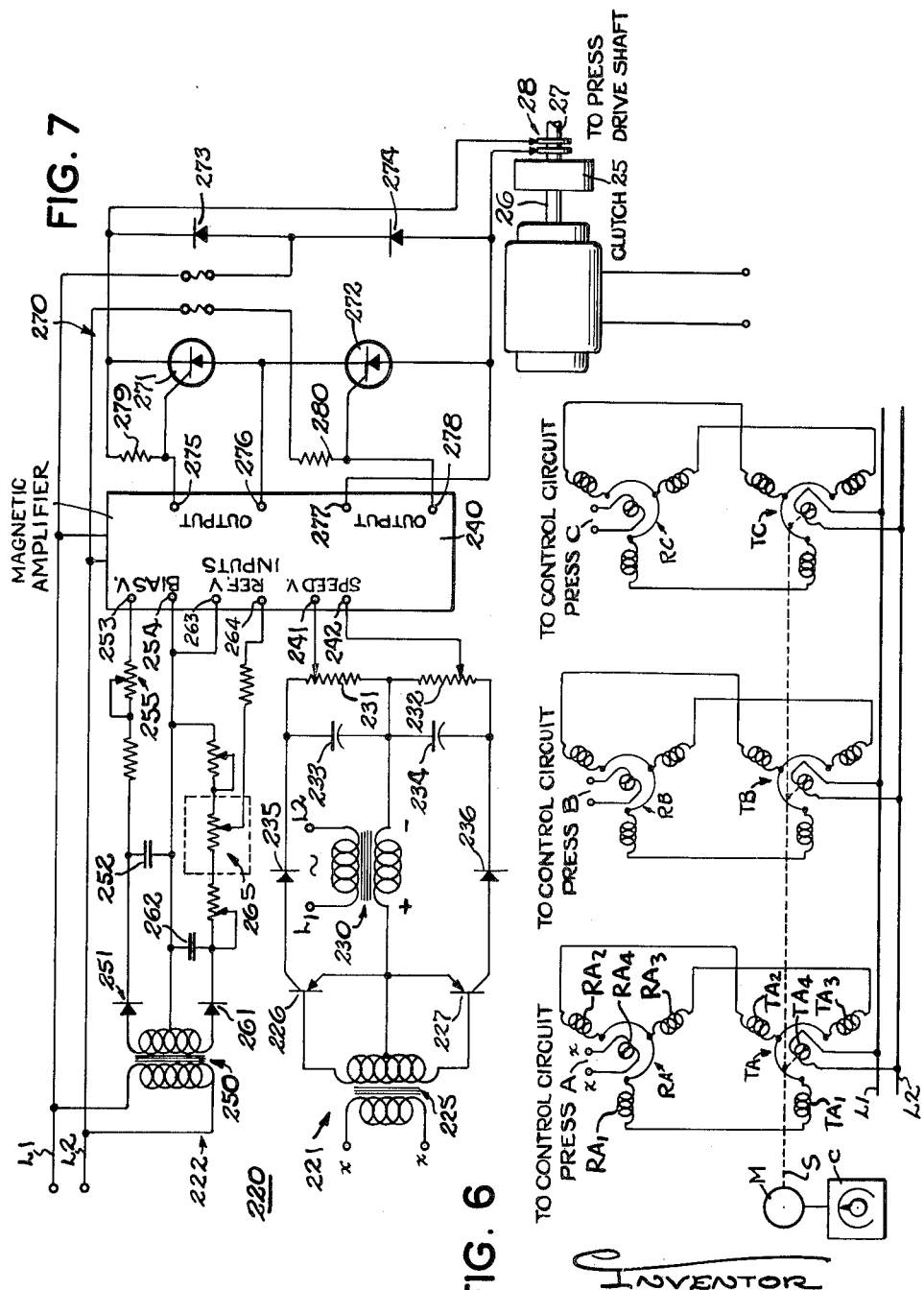

3,199,439
CONTROL ARRANGEMENT FOR AUTOMATIC PRESS LINE
James C. Danly, River Forest, Ill., assignor to Danly Machine Specialties, Inc., Chicago, Ill., a corporation of Illinois
Original application Mar. 26, 1964, Ser. No. 354,954. Divided and this application Nov. 24, 1964, Ser. No. 413,547
6 Claims. (Cl. 100—43)

This application is a divisional application based upon application Ser. No. 354,954, filed March 26, 1964.

The present invention relates to power presses and more particularly to a control system for synchronizing the operation of a series of presses and associated transfer mechanisms.

It is an object of the present invention to provide means for synchronizing the presses and transfer equipment in a press line for continuous operation. It is a related object to provide a synchronizing arrangement for a press line which permits each of the presses to operate at a high average speed and which permits maximum output for a given set of presses and a given power capability of the driving motors. It is another related object to provide a synchronizing arrangement for a press line which maintains the presses in step with one another but which nevertheless permits individual variations in speed through a given press cycle occurring by reason of the energy which is added to and subtracted from the press flywheel. Thus minor variations in speed during a single cycle are tolerated to allow each press to operate insofar as possible in accordance with a normal press cycle and eliminating the necessity for making unnecessary corrections in the intra-cycle press speed.

It is still another object of the invention to provide a synchronizing system for a line of power presses which is highly flexible and which permits individual presses to be silenced without affecting the synchronization of the remaining presses. In one of its aspects it is an object of the present invention to provide a synchronizing arrangement for a press line in which the speed may be easily and conveniently varied.

It is still another object of the present invention to provide a synchronizing arrangement for a line of presses and associated transfer equipment which is inherently simple and inexpensive, which permits standard presses having a standard clutch and drive to be employed, and which achieves the proper degree of synchronizing control, even with presses of high inertia, without necessity for resorting to derivative action. It is moreover an object to provide a synchronizing control arrangement for presses in the press line which avoids the complications of line shafting and oversized motors, and the attendant installation and maintenance expense which must be incurred where presses are mechanically interconnected.

Other objects and advantages of the invention will become apparent upon reading the attached detailed description and upon reference to the drawings in which:

FIG. 3 is a diagrammatic perspective view of the driving mechanism for one press in the line.

FIG. 4 is a vertical longitudinal section taken through one of the transfer mechanisms and looking along the line 4—4 in FIG. 2.

FIG. 5 is a fragmentary top view of a typical gripping mechanism.

FIG. 6 is a schematic diagram showing the synchros employed to synchronize the press drives.

FIG. 7 is a schematic diagram showing the clutch control circuit energized by one of the syncros in FIG. 6.

While the invention has been described in connection with a preferred embodiment, it will be understood that I do not intend to limit the invention to the embodiment shown but intend to cover the various alternative and equivalent constructions included within the spirit and scope of the appended claims.

Figure 1:
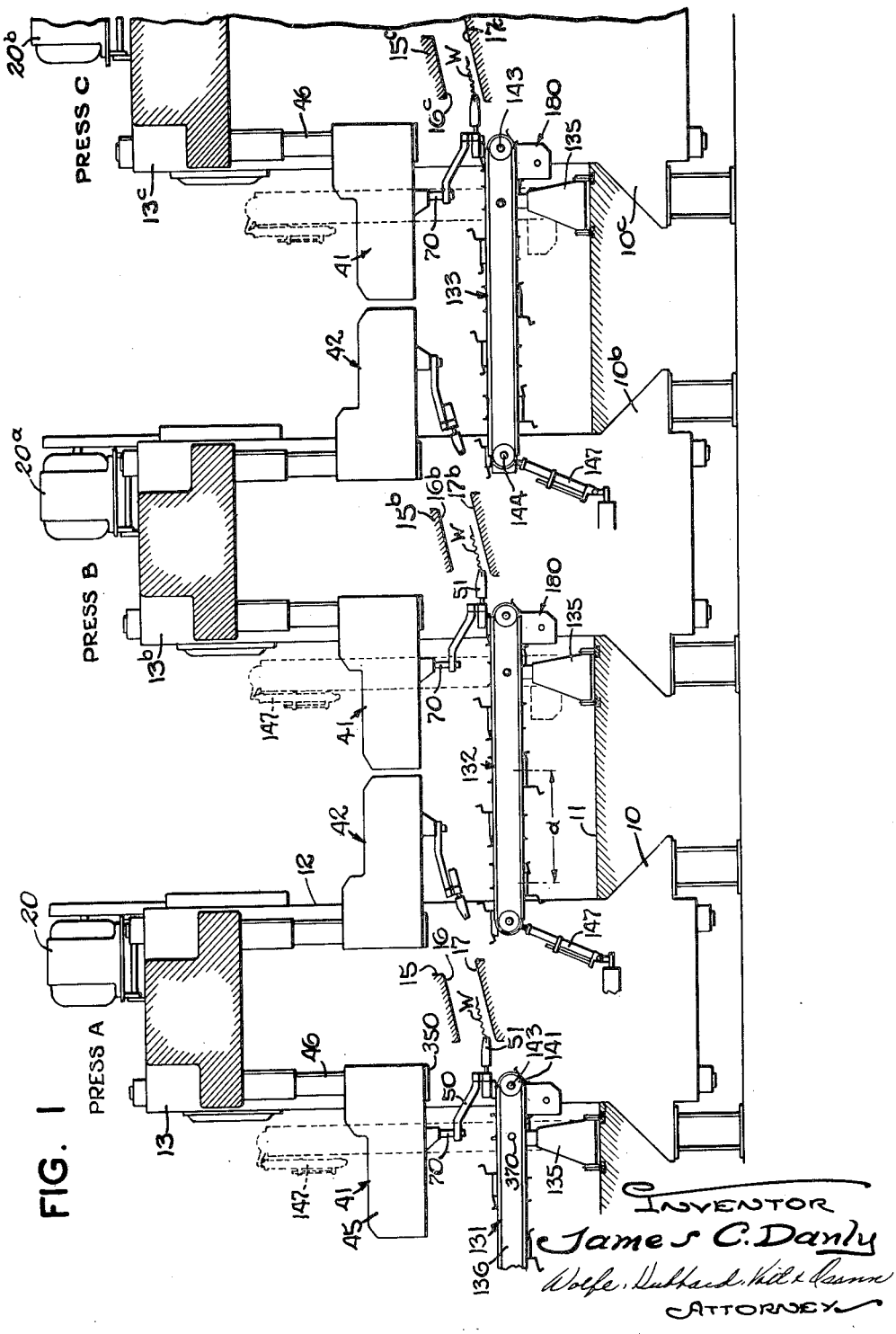
FIGURE 1 is a side elevation, partly diagrammatic, showing a portion of a press line to which the present invention has been applied.
Figure 2:
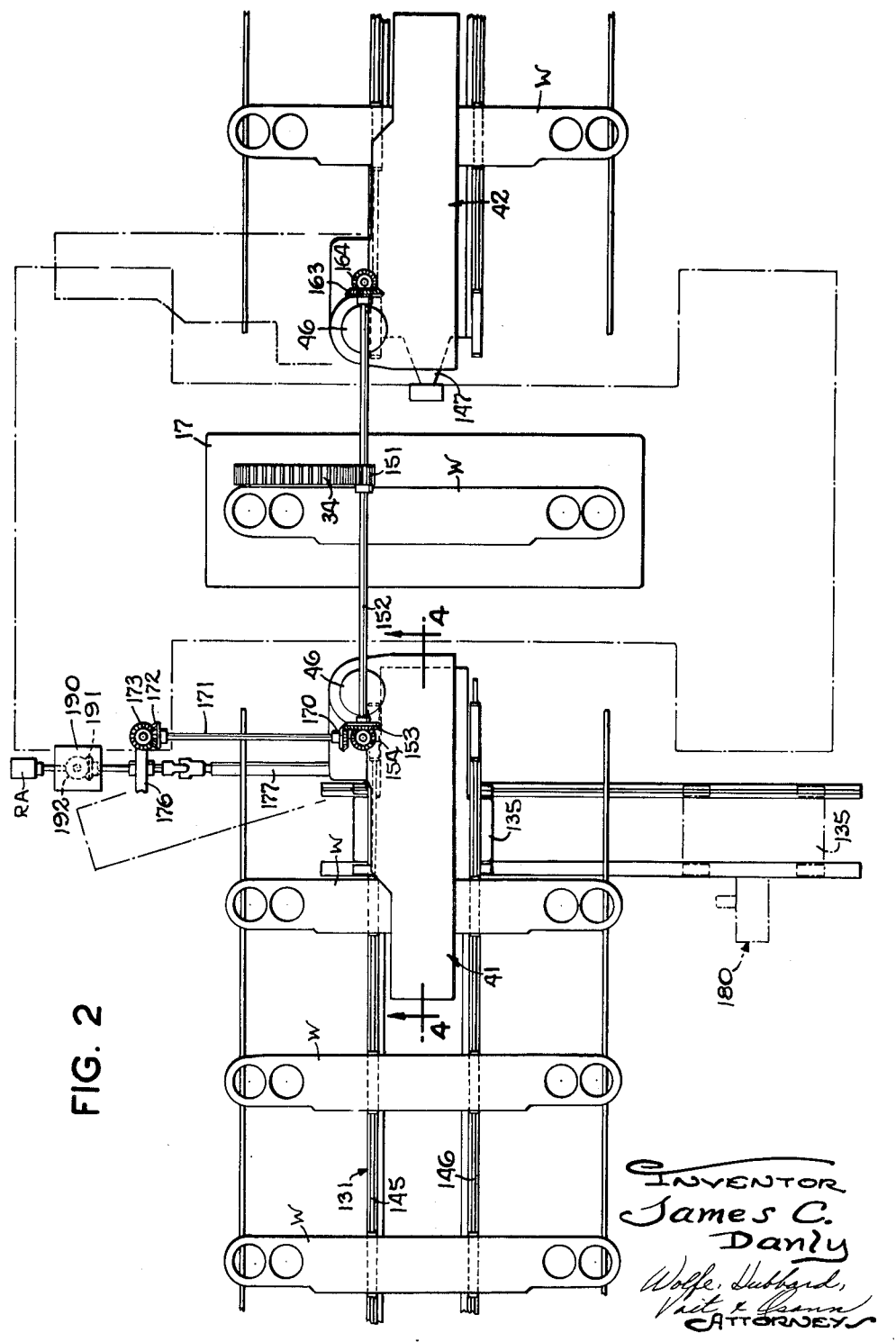
FIG. 2 is a phantom top view of one of the presses in the press line showing a portion of the driving mechanism.

Turning now to the drawings and particularly to FIG. 1, there is shown a portion of an automated press line intended for performing successive operations upon a workpiece W, for example, an automotive radiator grill. For purposes of illustration, only three presses have been shown, indicated press A, press B, and press C, together with their associated transfer and conveyor mechanisms, and it will be understood that the press line may in practice be extended to include any number of similar units in accordance with the present teachings. Taking press A by way of example, it includes a massive base 10 extending below the floor 11 and an upwardly extending frame 12 topped by a crown 13. Reciprocatingly mounted in the press frame is a slide diagrammatically indicated at 15 with cooperating upper and lower dies 16, 17 driven by a press driving motor 20.

Knowledge of only the main elements of a power press will permit full understanding of the present invention and for the details of a commercial or practical press, cross reference may be made to the trade literature and descriptive brochures of press manufacturers. It will suffice, therefore, to refer to the press driving elements but briefly, reference being made to FIG. 3 which is a diagrammatic perspective view of the drive mechanism. The motor 20 is shown feeding a stepdown drive connection including a belt 21 and pulleys 22, 23. Pulley 23 is connected to a clutch 25 having an input shaft 26, an output shaft 27 and slip rings 28. The clutch output shaft is coupled to an output pinion 30 which drives a pair of intermediate gears 31, 32 which mesh with the main press drive gears 33, 34 respectively. In a conventional press such gears are connected to the press pitman and the movement and phasing of the slide are under the joint control of timing cams and operating pushbuttons which, through appropriate and interlocked circuitry, control the energization of the clutch 25. In a subsequent section, setting forth control circuitry forming a part of the present invention, operation in the "continuous" mode will be described. However, it will be understood that for setting up the press and for safety purposes it is desirable to have the press controllable in the "inch" and "run" modes in addition to the "continuous" mode. Circuitry permitting operation in all three modes is disclosed in copending application Ser. No. 169,527, filed January 29, 1962. In the subsequent presses B and C in the line, corresponding reference numerals, with the addition of subscripts "b" and "c" respectively, have been employed to represent corresponding parts.

Each of the presses is equipped with novel loading and unloading transfer mechanisms, the first for moving workpieces into the working area from the input side and the second for moving workpieces out of the working area at the output side. Taking press A by way of example, the first or loading transfer mechanism is indicated at 41 and the second or unloading transfer mechanism is indicated at 42. Since the two transfer mechanisms are substantial duplicates of one another, differing only in the programmed movement, primary reference will be made to the mechanism of 41 at the input. The mechanism includes a supporting frame 45 in the form of a bracket which extends, cantilever fashion, from the input side of the press, being supported from a vertically depending post 46 which, in turn, is anchored to the crown 13 of the press. Extending in folded back relation under the bracket 45 is a transfer arm 50 having a gripper 51 for gripping a workpiece W and for depositing it on the lower die 17.

For transporting the arm 50 for horizontal movement, a carrier 60 is provided which is rollably secured upon, and guided by, a pair of ways 62 which extend the length of the bracket 45 and which in the present instance constitute the bottom wall thereof. The carrier is maintained centered between the opposed surfaces of the ways by rollers 63 at the inner end and rollers 64 at the outer end. To hold the carriage captive against vertical movement with respect to the ways, horizontal pairs of rollers 65, 66 are provided at the inner end engaging the upper and lower way surfaces, respectively, while corresponding pairs of rollers 67, 68 serve to guide the outer end. It will be apparent that with the rollers 63–68 drawn up against their guide surfaces the carrier is positively guided for horizontal movement completely free of any possibility of twisting or binding.

For the purpose of imparting a vertical component of movement to the arm 50, the arm is secured to a square, hollow supporting post 70 having machined sides and which is guided for vertical movement in the carriage. A pair of profiled cams mounted on the same input shaft are provided for imparting coordinated, horizontal and vertical components of motion to the post 70 and the transfer arm 50 which is connected to it. Thus transversely arranged in the base portion of the bracket 45 is an input shaft 80 having a first cam 81 and a second cam 82 rigidly secured thereto and arranged side by side. Riding upon the outer edge of the cam 81 is a cam follower roller 83 which is secured to a depending, horizontally pivoted motion arm 84 which is pivoted at its upper end 85. The lower end of the motion arm is connected to a yoke 86 formed of a pair of links straddling the carriage, the yoke being pivoted at 87–88. To safely arrest forward motion of the transfer arm 50 in the event of striking an obstruction, an air ram 90 is secured to a bracket 91 having a piston rod 92 connected to the cam follower roller 83 and arm 84. Sufficient air pressure is furnished to the air ram to insure that the cam follower roller 83 remains in contact with the cam for all normal operation. It will be apparent, then, that as the input shaft 80 rotates, the cam 81, acting upon the cam follower roller causes the motion arm 84 to swing backwardly and forwardly accompanied by backward and forward movement of the transfer arm 50 in accordance with a certain program of horizontal movement and depending upon the cam profile.

For the purpose of imparting vertical movement to the post 70, the control cam 82 is engaged by a cam follower roller 93 which is pinned to a motion arm 94 which is pivoted to the bracket at pivot 95. Secured to the end of the arm 94 is a link 96 having an upper pivot 97 and a lower pivot 98. To conduct the movement of the link to the carriage 60, regardless of the horizontal position of the carriage, a longitudinally extending spline shaft 100 is provided journaled at its ends 101, 102, respectively. The shaft is rotated by a bevel pinion 103 secured to the forward end which meshes with the bevel gear 104 which is rockingly coupled to the linkage previously described. Telescoped over the spline shaft 100 and slidable thereon is a post gear 110. A rack 115, secured to the post 70, meshes with the gear. Means similar to that previously described are provided for maintaining the cam follower 93 in contact with the cam 92. Thus I employ an air ram 120 which is anchored at its end 121 and which has its piston rod pinned at 122 to the vertical motion arm 94. Thus, as the input shaft 80 is rotated, rocking of the cam follower 93 produces similar rocking movement of the bevel gear 104 and rotation of the splined shaft 100 which, acting through the sliding gear 110 and the rack 115 imparts vertical movement to the post 70.

Conveyors are provided leading to the first press and bridged between the presses for conveying the workpieces and for positioning the workpieces for convenient and accurate gripping by the transfer arms of the adjacent transfer mechanisms. I thus provide an input conveyor 131 and successive conveyors 132, 133 which are substantial duplicates of one another. At the end of the conveyor adjacent the press A a supporting base structure 135 is provided supporting a conveyor frame 136 which normally extends horizontally as shown. Journaled at the ends of the frame 136 are a first set of conveyor sprockets 141 and a second set of conveyor sprockets 142 secured to axles 143, 144 respectively. Trained about the sprocket wheels on each side of the conveyor are sprocket chains 145, 146. The overhanging end of the conveyor frame is supported by a supporting post 147.

The transfer mechanisms at the input and output sides of a given press and at least one of the associated conveyors are directly coupled to the press drive for movement which is previsely coordinated with the movement of the press slide. Moreover, means are provided for substantially synchronizing the phase position of the outputs of the respective press drives, and the conveyors are each provided with an intermittent drive coupling to establish a dwell period at the points of loading and unloading of the workpieces thereby to insure proper engagement and disengagement of the workpiece notwithstanding any minor variations in synchronism which may exist between the outputs of the drives of the adjacent presses. The means for establishing synchronism in the phase position of the outputs of the press drives will be discussed at a later point in connection with FIGS. 6 and 7. For the moment, attention will be focused upon the mechanism for effecting the coordinated driving of the transfer mechanisms and conveyors by the drive of the associated press.

Thus referring to FIG. 3, one of the main press drive gears, in this case the gear 34, is meshed with a power takeoff pinion 151 secured to a horizontally extending power takeoff 152. For driving the first transfer mechanism 41 the power takeoff shaft is coupled, via bevel gears 153, 154, to a vertical shaft 155 leading to a speed reducer 156 which may be of any type capable of producing an appropriately reduced output speed at the drive shaft 80 leading to the horizontal and vertical positioning cams 81, 82 previously discussed. At the other end of the shaft a similar pair of bevel gears 163, 164, transmits power to a vertical shaft 165 feeding a speed reducing device 166 which drives the shaft 80 and which serves to rotate the positioning cams in the second transfer mechanism 42.

For direct coupling to the drive of the conveyor 131, a bevel gear 170 is provided meshing with the bevel gear 153 and having a horizontal shaft 171 which is coupled, via a pair of bevel gears 172, 173, to a vertical conveyor driving shaft 174. At its lower end the latter carries a worm gear 175 meshing with a worm wheel 176 powering a horizontal conveyor drive shaft 177. For producing intermittent or indexed movement of the conveyor to provide a dwell period of the workpiece at the point of pickup by the gripper on the transfer arm an intermittent drive unit 180 of the roller-drive controlled-acceleration type is used. As set forth in FIG. 3, the unit includes first and second cams 181, 182 having three legged cam followers 183, 184, with rollers mounted at the ends of the legs. The cam followers are secured to an output shaft 185. In operation, each time one of the cam members rotates it advances the associated cam follower through an arc of movement which, in the present instance, is one-twelfth of a revolution of the output shaft. Since two cams and cam followers are employed in offset phase relation, the output shaft 185 is advanced in increments with a net stepdown ratio of 6:1. The cams are profiled to produce a dwell period of approximately 50%, i.e., equal to the period during which advancement takes place. To transmit this intermittent motion to the conveyor chains, an output gear 186 is secured to the shaft 185 and meshes with a drive pinion 187 on conveyor sprocket shaft 143. The overall ratio is such that the conveyor belt advances a distance *d* (FIG. 1) for each step of advance of the intermittent drive mechanism 180.

Also shown in FIG. 3 are the elements sensitive to the press phase position, namely the timing cam assembly shown diagrammatically at 190, which may correspond to timing cams used for interlock purposes in a regular power press, and synchro RA used to energize the control circuit to be discussed later in connection with FIGS. 6 and 7. The timing cam assembly is driven via bevel gears 191, 192 which rotate a vertical shaft 194.

Having reviewed the mechanism provided for moving the transfer arm 50, attention may now be given to the construction of the gripper at the end of the arm which grips the workpiece *w*. The gripper includes a base 200 which is clamped to the end of the arm 50 and a jaw extension 201 slidably mounted on posts 202 and which provides a first pair of laterally spaced jaw elements 203. A lower, movable jaw member 205 cooperates with the jaw extensions 201. When air is applied to the ram 210 for extending movement via a suitable air line (not shown) the extension 201 is moved outwardly followed by movement of the slide so that closing torque is transmitted to the movable jaw. When the movement of the ram is reversed, the movable jaw is free to spring to the open position followed by retraction. It will be understood that the particular clamping device discussed above, while constituting a preferred construction, is nevertheless simply exemplary of the many different kinds of work-engaging clamps which may be used to carry out the present invention.

Synchronizing control circuit

In accordance with the present invention transmitter means driven by an auxiliary variable speed motor is employed to produce synchronizing signals which are compared to signals generated by receivers individually coupled to the drive shafts of the respective presses to produce, for each of the presses, a net output signal having a sense and amplitude which varies in accordance with the direction and amount of lead or lag of the press relative to the shaft of the auxiliary motor. The net output signal from a receiver, amplified by means of an amplifier, is employed to energize an output control device which drives the associated drive shaft for corrective adjustment of the speed of the shaft. In the present instance, the output control device is the variably energizable clutch 25. Thus transmitting synchros are provided such as TA having windings connected in star formation as indicated by the subscripts 1—3 and cooperating with a rotor as indicated by subscript 4. The companion receiving synchro RA is of similar construction and the stator windings of the two synchros are connected together as shown. The rotors of the transmitting synchros are all mechanically coupled to the shaft S of a variable speed auxiliary motor M having a speed setting controller C. The motor and controller, which are shown diagrammatically, may be any suitable motor and controller permitting the speed of the shaft S to ve varied over the desired speed range of the presses in the press line.

Where a press is rotating in the desired condition of synchronism, zero voltage is produced at the output terminals X—X of its receiving synchro. However, where the press tends to lag or lead the shafts of the auxiliary motor an output voltage is produced at the terminals which varies in phasing and magnitude depending upon the direction and amount of lag or lead.

In accordance with one of the aspects of the present invention an amplifier including a discriminator is employed for converting the A.-C. control signal from the receiving synchro to an amplified direct voltage of corresponding sense and polarity for corrective energization of the clutch 25 so that the press is slowed down if leading and speeded up if lagging as required to restore a condition of synchronism.

The control circuit 220, in FIG. 7, has a first or input portion including a discriminator 221 for converting the synchro output signal to a D.-C. voltage of corresponding magnitude and polarity and a second portion 222 which furnishes a reference voltage. Turning first to the discriminator, it includes a transformer 225 having a center tapped secondary winding feeding the input circuits of transistors 226, 227. The output circuits of the transistors are energized by a transformer 230 in the central leg of the circuit in series with respective loading resistors 231, 232. The latter are shunted by capacitors 233, 234 respectively. Diodes 235, 236 are included in the load circuit to protect the transistors against reverse voltage. The transformer 230 which furnishes current to the transistor output circuits has its primary connected to the same supply lines L1, L2 which energize the transmitting synchros. Under conditions of balance, i.e., where the interconnected transmit receiving synchros are rotating in precise phase position, there is no output signal across the load resistors 231, 232. However, upon departure from the in-phase condition, an a.c. input signal is generated which is of either direct or opposite phase depending upon whether the speed of the controlled press drive is tending to lead or lag. Where the input signal is of "leading" phase, the conditions are met before conduction in one of the two transistors, say the transistors 226, producing a direct voltage across the load resistor 231. Where the input signal is of "lagging" phase, conditions are met for conduction in transistor 227 producing a direct voltage across its load resistor 232. The net voltage is applied to input terminals 241, 242 of a magnetic amplifier 240.

For the purpose of providing bias to the magnetic amplifier, a transformer 250 is provided having a rectifier 251 and filter capacitor 252, with the output voltage being applied to the bias terminals 253, 254. The amount of bias is under the control of a series rheostat 255. A somewhat similar circuit is used to provide reference voltage to a rectifier 261 having a filter capacitor 262 feeding reference terminals 263, 264 and with the amount of the reference voltage being settable by a resistor network 265.

For further amplifying the output of the magnetic amplifier, a power amplifier circuit 270 is used in the form of a controlled bridge rectifier made up of silicon controlled rectifier units 271, 272 and non-controlled rectifiers 273, 274 feeding clutch slip rings 28. The rectifier 271 has its gate-anode or firing circuit connected across output terminals 275, 276 while the rectifier 272 has its firing circuit connected across output terminals 277, 278. Resistors 279, 280 connected between gate and cathode are conventional to provide a path for the reset current and to insure that the rectifier turns off during the reverse part of the power cycle.

Since the circuit 270 is conventional, it will suffice to describe it briefly. At low values of signal from the magnetic amplifier the flow of output signal is blocked until late in the cycle in the A.-C. wave so that little current is conducted during the effective half cycle. With higher voltages applied to the gate electrode, the device is turned on during substantially the entire forward portion of the conducting cycle and offers low resistance to current flow so that substantially full current flows through the eddy current clutch 25. Intermediate values of input voltage to the controlled rectifiers result in intermediate values of current in the clutch. The circuit 270 provides large current amplification since as little as 50 milliamperes in the gating circuit is capable of controlling clutch currents of 16 amperes or even higher.

In accordance with one of the detailed aspects of the present invention the control circuit preferably has a time constant which is characteristic of magnetic amplifiers and magnetic clutches, i.e., a time constant sufficiently long so that a system will have only limited response to the incidental instantaneous changes in speed which occur during a typical cycle of a conventional press in which the moving parts have substantial inertia and in which a flywheel is conventionally employed for absorbing energy during the light load portion of the cycle and for giving up energy during the working portion of the cycle. The present control arrangement thus permits each press drive to operate in nearly normal fashion, i.e., with intra-cycle variations and without requiring any increase in the rating of the press drive motor.

The present system is thus to be distinguished from one in which the instantaneous position of the controlled shaft is made to coincide precisely with the instantaneous position of the controlling shaft. This system is also to be distinguished from the usual master-slave arrangement where one of the working units is selected as the master and where all of the other working units follow it as slaves. In such a system the net control signal, being subject to the accelerational and decelerational effects in the shaft of the master would tend to produce corresponding accelerations and decelerations in the shafts of the slave presses giving rise to large instantaneous values of error and hence large and erratic changes in the current supplied to the clutches. Since the auxiliary motor operates at a constant, but adjustable speed the only extraneous variation in the control signal is that brought about by accelerational forces in the press being controlled which may be more readily tolerated by the control system, and this fact, plus the provision for "dwell" which constitutes a safety factor, has been found to produce satisfactory synchronism notwithstanding the ponderous nature of the machines being controlled. Thus the dwell is sufficient to accommodate variations in phasing of adjacent presses by wider margin than will normally be encountered in a practical installation and it is possible to operate all the presses in the "continuous" mode with the slides cycling continuously at a speed on the order of fifteen strokes per minute hour after hour as long as workpieces are fed into the press line. There is no necessity for any interlocks between adjacent presses with one press triggering the motion of another, a factor which has limited the top speed of the press lines employed in the past.

Moreover, since no one of the presses serves as a master, any one of the presses in the line may be silenced without affecting the synchronization of the remaining presses. Thus press "A" may simply be silenced where it is desired to eliminate an initial step in a series of press operations without any further change in the control system.

It will be apparent to one skilled in the art that the above scheme is inherently more economical than synchronized drives employing line shafts, in the saving of initial installation expense, in reduced maintenance, and in the ease of silencing individual presses. Indeed, the presses which are not actively used in the line may be normally operated and fed and need not be idle.

Finally it will be noted by one skilled in the art that the control has been achieved without necessity for resorting to derivative action.

It will also be apparent to one skilled in the art that the function of the transmitting synchros is to set up syncronized rotating fields in the receiving synchros for reference purposes. Hence the input leads to the stator windings of the receiving synchros may be connected to any source, even a static source, capable of doing this without departing from the invention. Indeed, while A.-C. transmitters and receivers are used in the preferred embodiment with a number of interesting advantages, the invention is not limited thereto and D.-C. units may be substituted without departing from the present teachings.

The term synchro "couple" refers to the combination of a transmitting and receiving synchro.

I claim as my invention:

1. In a press line for performing a series of press operations on a workpiece, the combination comprising a series of power presses each having a drive shaft and slide as well as a motor and interposed variable energizable output control device for driving the shaft, transfer mechanisms coupled to the drive shafts of the respective presses for moving a workpiece in at one side of the press and out at the other time with the upward movement of the associated slide, a set of transmitting synchros, a set of receiving synchros electrically coupled thereto, said receiving synchros being mechanically coupled to the respective drive shafts, means including a variable speed motor for driving all of the transmitting synchros in unison with one another, and means responsive to the output signals from the receiving synchros for correctively varying the energization of the output control devices in the respective presses.

2. In a press line for performing a series of press operations on a workpiece, the combination comprising a series of power presses having a drive shaft and slide as well as a motor and interposed variably energizable output control device for driving the shaft, transfer mechanisms coupled to the drive shafts of the respective presses for moving a workpiece in at one side of the press and out at the other timed with the upward movement of the associated slide, an A.-C. source, a set of transmitting synchros each having stator and rotor windings, a set of receiving synchros each having stator and rotor windings and mechanically coupled to the respective drive shafts, said stator windings being connected together, each press having a control circuit connected to said A.-C. source and having its input connected to the rotor winding of its associated synchro and its output connected to the associated output control device, an auxiliary variable speed drive, all of said transmitting synchros having their rotor windings connected to said A.C. source and having their rotors mechanically coupled to the variable speed drive so that the drive shafts of all of the presses tend to rotate in unison with the variable speed drive.

3. In a press line for performing a series of press operations on a workpiece, the combination comprising a series of power presses each having a drive shaft and slide as well as a motor and interposed variably interposed energizable output control device for driving the shaft, transfer mechanisms coupled to the drive shafts of the respective presses for moving a workpiece in at one side of the press and out at the other for transfer of the workpiece along the press line, first and second sets of synchros respectively wired together, a source of A.-C. reference potential, amplifiers for energizing the respective output control devices, the rotors of one set of synchros having a variable speed drive for driving the same in unison, the rotors of the other sets of synchros being coupled to the respective press drive shafts, the rotor windings of one set of synchros being coupled to the source of reference potential and the rotor windings of the other set of synchros being connected to the respective amplifiers, each of said amplifiers including a discriminator connected to the source or reference potential so that departure of a press drive shaft from a condition of synchronism with the variable speed drive results in corrective energization of the associated output control device to restore the condition of synchronism.

4. In a press line for performing a series of press operations on a workpiece, the combination comprising a series of power presses each having a drive shaft and slide as well as a motor and interposed variably energizable output control device for driving the shaft, transfer mechanisms coupled to the drive shafts of the respective presses for moving a workpiece in at one side of the press and out at the other timed with the upward movement of the associated slide for transfer of the workpiece along the press line, a set of syncho couples, each having first and second mechanical connections and first and second electrical connections, a source of reference A.-C. voltage, amplifiers for energizing the respective output control devices, a variable speed drive mechanically coupled to the first mechanical connections of each couple, the second mechanical connection of each couple being respectively connected to the drive shafts of the presses, a source of reference A.-C. voltage connected to said first electrical connection of each couple, the second electrical connection of each couple being fed to the input terminals of the respective amplifiers, each of said amplifiers including a discriminator coupled to the source of reference voltage for converting the A.-C. signals from the couples to D.-C. signals of corresponding magnitude and polarity for application to said output control devices.

5. In a press line for performing a series of press operations on a workpiece, the combination comprising a series of power presses each having a drive shaft and slide as well as a motor and interposed variably energizable output control device for driving the shaft, transfer mechanisms coupled to the drive shafts of the respective presses for moving a workpiece in at one side of the press and out at the other timed with the upward movement of the associated slide for transfer of the workpiece along the press line, amplifiers associated with individual output control devices for variably energizing the latter, synchro devices mechanically coupled to the respective press drive shafts and having input windings and output windings, means for energizing the input windings to produce synchronous rotary fields in the respective synchro devices, the output windings of the synchro devices being connected to the respective amplifiers so that when the drive shaft of one of the presses tends to get out of synchronism with the rotary field in the attached synchro device a voltage is applied to the amplifier correctively energizing the output control device to restore the condition of synchronism.

6. In a press line for forming a series of press operations on a workpiece, the combination comprising a series of power presses each having a drive shaft and slide as well as a motor and interposed variably energizable output control device for driving the shaft, transfer mechanisms coupled to the drive shafts of the respective presses for moving a workpiece in at one side of the press and out at the other timed with upward movement of the associated slide for transfer of the workpiece along the press line, an auxiliary motor, transmitting means coupled to the auxiliary motor for producing an output signal in accordance with the phase position of the shaft of such motor, receiving means coupled to each of the drive shafts of the respective presses for producing an output signal in accordance with the phase position of the drive shaft and having electrical output terminals, said transmitting means and said receiving means being electrically connected so that a signal is produced at the output terminals which varies in sense and magnitude depending upon whether the associated press drive shaft lags or leads the shaft of the auxiliary motor and the amount of lag or lead, each of said output control devices having an amplifier for energizing the same with the amplifier input being coupled to the output terminals of the associated receiving means so that upon any tendency for the press drive shaft to get out of synchronism with respect to the shaft of the auxiliary motor the associated output control device is correctively energized to restore the condition of synchronism.

References Cited by the Examiner

UNITED STATES PATENTS

| | | | |
|---|---|---|---|
| 1,993,754 | 3/35 | Smith et al. | 214—1 |
| 2,754,555 | 7/56 | Young | 214—1 |
| 2,763,229 | 9/56 | Sahlin | 214—1 X |
| 2,815,866 | 12/57 | Watter | 100—207 X |
| 2,894,616 | 7/59 | Young | 214—1 X |
| 2,899,043 | 8/59 | Young | 214—1 X |
| 2,934,218 | 4/60 | Peras | 214—1 |
| 3,076,906 | 2/63 | Simo | 318—85 X |

FOREIGN PATENTS 152,591  7/53  Australia.

WALTER A. SCHEEL, *Primary Examiner.*